United States Patent

Glezer et al.

[11] Patent Number: 5,653,579
[45] Date of Patent: Aug. 5, 1997

[54] CERAMIC BLADE WITH TIP SEAL

[75] Inventors: Boris Glezer, Del Mar; Narender K. Bhardwaj; Russell B. Jones, both of San Diego, all of Calif.

[73] Assignee: Solar Turbines Incorporated, San Diego, Calif.

[21] Appl. No.: 555,686

[22] Filed: Nov. 14, 1995

[51] Int. Cl.$^6$ .................................................... F01D 5/20
[52] U.S. Cl. ................................. 415/173.1; 415/173.6
[58] Field of Search .......................... 415/170.1, 173.1, 415/173.4, 173.6; 277/53

[56] References Cited

U.S. PATENT DOCUMENTS

| | | | |
|---|---|---|---|
| 4,050,845 | 9/1977 | Gemein et al. | 415/173.6 |
| 4,057,362 | 11/1977 | Schwaebel | 415/173.6 |
| 5,106,104 | 4/1992 | Atkinson et al. | 277/53 |
| 5,439,347 | 8/1995 | Brandon | 277/53 |
| 5,480,162 | 1/1996 | Beeman, Jr. | 277/53 |
| 5,503,528 | 4/1996 | Glezer et al. | 415/200 |
| 5,511,940 | 4/1996 | Boyd | 415/200 |

OTHER PUBLICATIONS

"Some Metallographic Results for Brush Bristles & Brush Segments . . . " Preprint from Seals Flow Code Development—93 NASA Conference Nov. 3, 1993.

*Primary Examiner*—John T. Kwon
*Attorney, Agent, or Firm*—Larry G. Cain

[57] ABSTRACT

The present gas turbine engine (10) includes a disc assembly (64) defining a disc (66) having a plurality of blades (70) attached thereto. The disc (66) has a preestablished rate of thermal expansion and the plurality of blades have a preestablished rate of thermal expansion being less than the preestablished rate of thermal expansion of the disc (66). A shroud assembly (100) is attached to the gas turbine engine (10) and is spaced from the plurality of blades (70) a preestablished distance forming an interface (108) therebetween. Positioned in the interface is a seal (110) having a preestablished rate of thermal expansion being generally equal to the rate of thermal expansion of the plurality of blades (70).

16 Claims, 4 Drawing Sheets

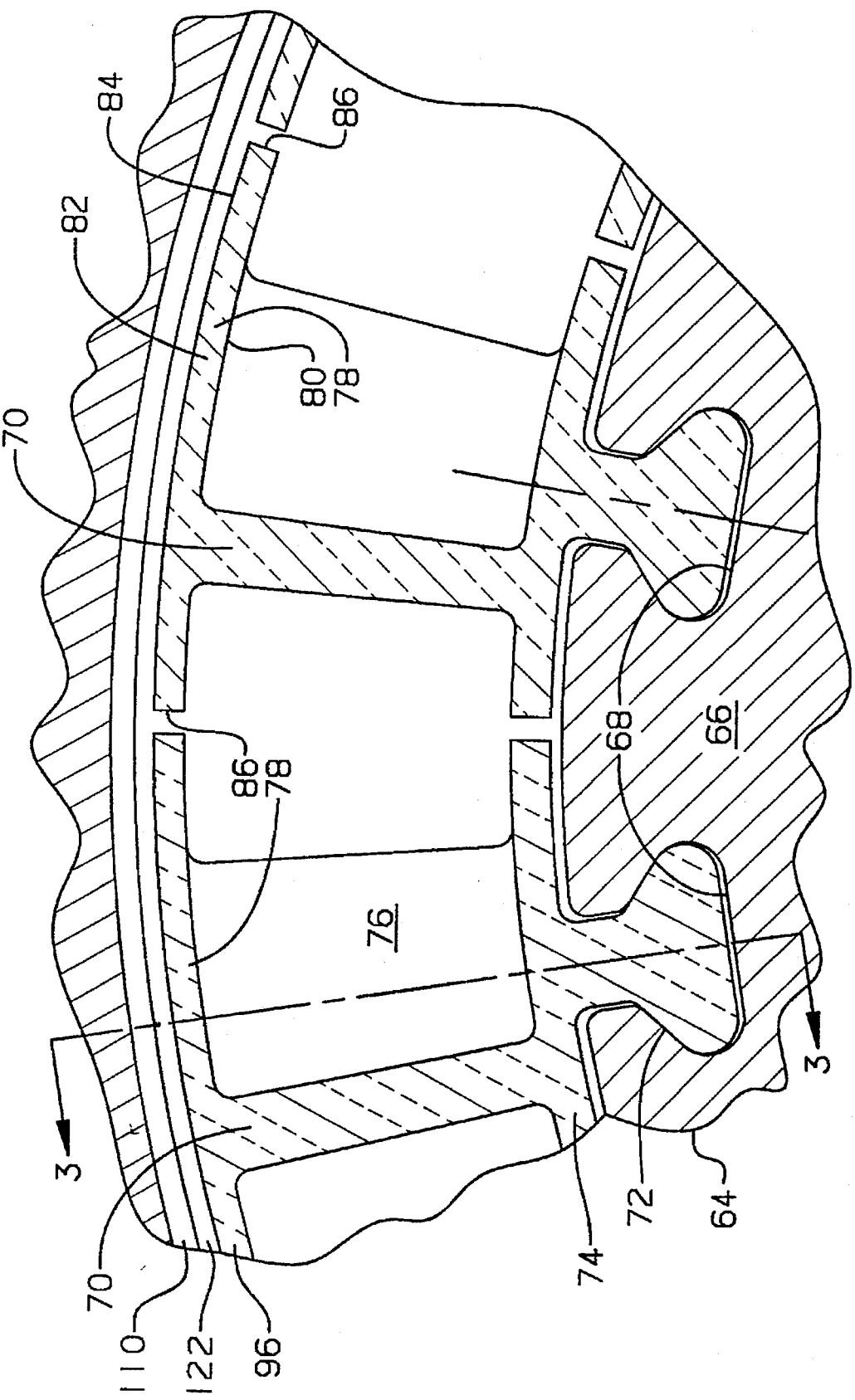

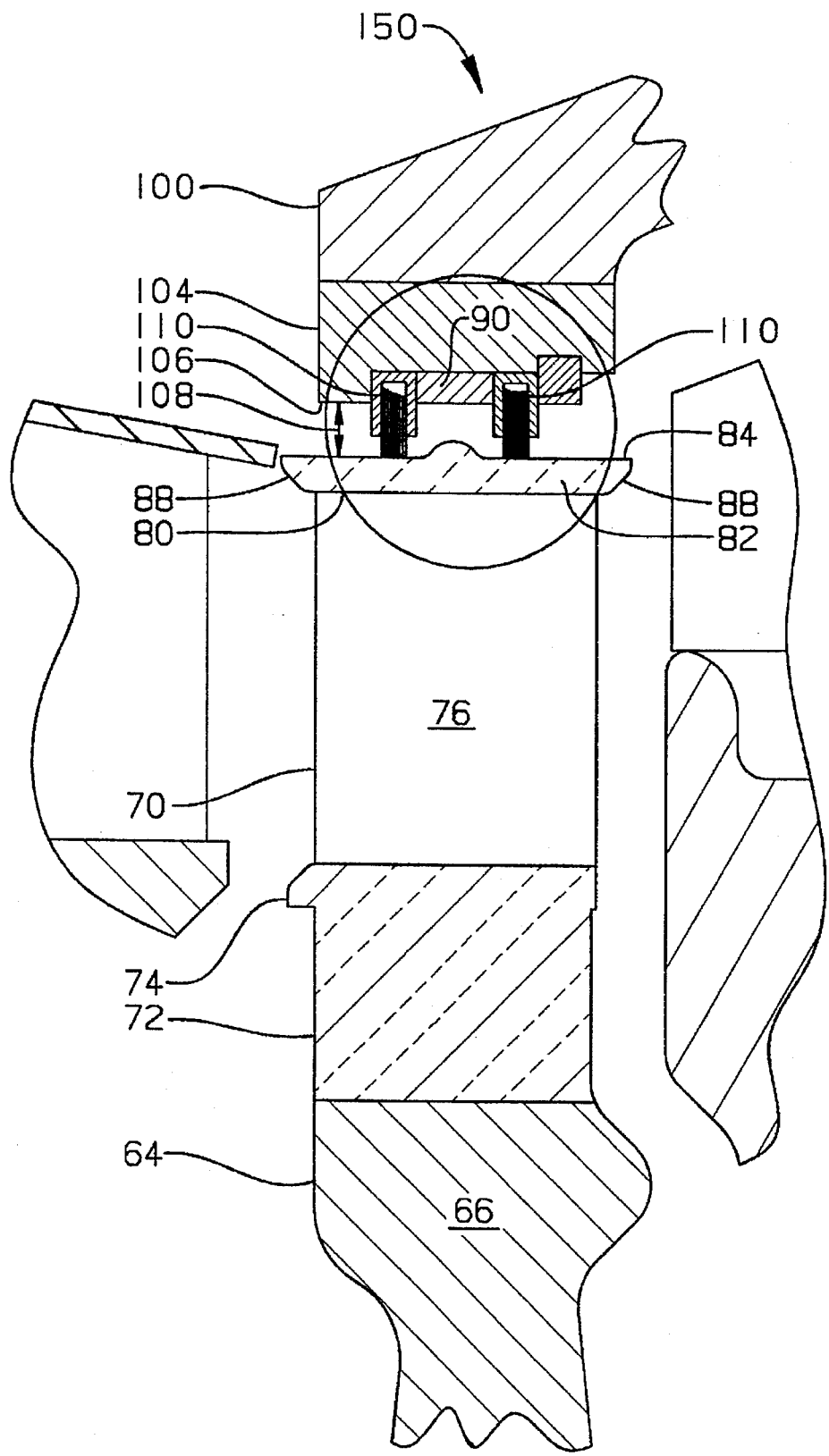
Fig_3

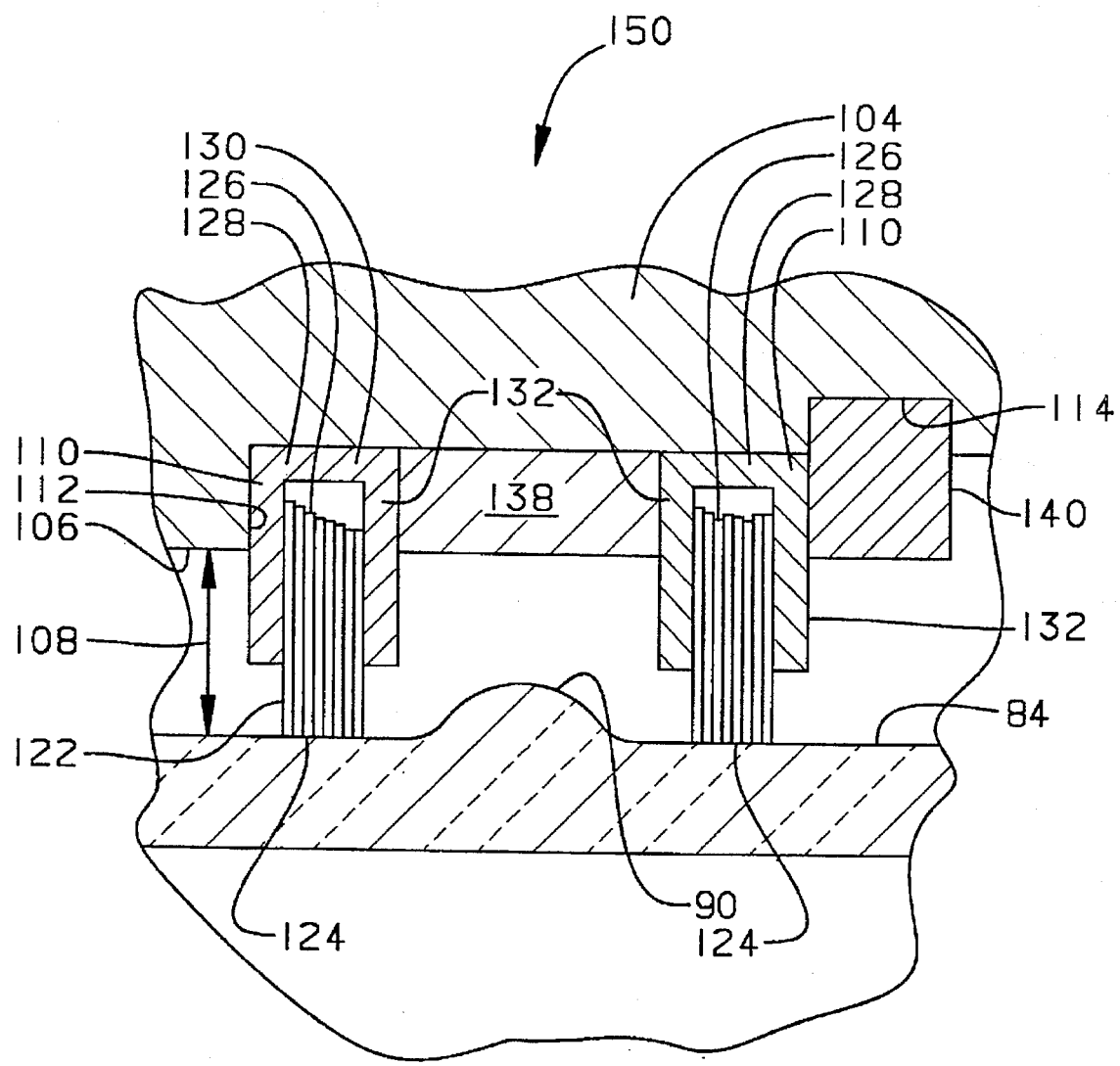

5,653,579

CERAMIC BLADE WITH TIP SEAL

"The Government of the United States of America has rights in this invention pursuant to Contract No. DE-AC21-93-MC30246 awarded by the U.S. Department of Energy."

TECHNICAL FIELD

This invention relates generally to a gas turbine engine and more particularly to a metallic turbine wheel having a ceramic blade attached therein and a tip seal for use with the ceramic blade.

BACKGROUND ART

In operation of a gas turbine engine, air at atmospheric pressure is initially compressed by a compressor and delivered to a combustion stage. In the combustion stage, heat is added to the air leaving the compressor by adding fuel to the air and burning it. The gas flow resulting from combustion of fuel in the combustion stage then expands through a turbine, delivering up some of its energy to drive the turbine and produce mechanical power.

In order to produce a driving torque, the axial turbine consists of one or more stages, each employing one row of stationary nozzle guide vanes and one row of rotating blades mounted on a turbine disc. The nozzle guide vanes are aerodynamically designed to direct incoming gas from the combustion stage onto the turbine blades and thereby transfer kinetic energy to the blades.

The gases typically entering the turbine have an entry temperature from 1850 degrees to 2200 degrees Fahrenheit. Since the efficiency and work output of the turbine engine are related to the entry temperature of the incoming gases, there is a trend in gas turbine engine technology to increase the gas temperature. A consequence of this is that the materials of which the blades and vanes are made assume ever-increasing importance with a view to resisting the effects of elevated temperature.

Historically, nozzle guide vanes and blades have been made of metals such as high temperature steels and, more recently, nickel alloys, and it has been found necessary to provide internal cooling passages in order to prevent melting. It has been found that ceramic coatings can enhance the heat resistance of nozzle guide vanes and blades. In specialized applications, nozzle guide vanes and blades are being made entirely of ceramic, thus, imparting resistance to even higher gas entry temperatures.

However, if the nozzle guide vanes and/or blades are made of ceramic, which have a different chemical composition, physical property and coefficient of thermal expansion to that of a metal supporting structure, then undesirable stresses, a portion of which are thermal stresses, will be set up between the nozzle guide vanes and/or blades and their supports when the engine is operating. Such undesirable thermal stresses cannot adequately be contained by cooling.

Furthermore, conventionally the interface between a turbine's metallic blades and the rigid turbine stator will accept a predetermined amount of rubbing therebetween. However, ceramic blade tips cannot rub as have conventional metallic blades. The result of ceramic blade rubbing with the rigid turbine stator is catastrophic failure. Thus, an increased blade tip clearance is required to avoid tip rubbing resulting in a significant performance penalty.

The present invention is directed to overcome one or more of the problems as set forth above.

DISCLOSURE OF THE INVENTION

In one aspect of the invention, a sealing device includes a disc assembly defining a disc being made of a material having a preestablished rate of thermal expansion. A plurality of blades are attached to the disc and each of the plurality of blades is made of a material having a preestablished rate of thermal expansion being less than the preestablished rate of thermal expansion of the disc. Each of the plurality of blades has a rotating tip formed thereon defining a surface thereon. A shroud assembly is spaced a preestablished distance from the plurality of blades and the shroud assembly has an inner surface defined thereon. An interface is formed between the inner surface and the surfaces defined on the rotating tips of the plurality of blades. A seal is positioned within the interface and is attached to the shroud assembly.

In another aspect of the invention, a gas turbine engine has an outer housing and a central axis defined therein, the gas turbine engine is comprised of a disc assembly being rotatably positioned about the central axis and defines a disc being made of a material having a preestablished rate of thermal expansion. A plurality of blades are attached to the disc and are made of a material having a preestablished rate of thermal expansion being less than the preestablished rate of thermal expansion of the disc. Each of the plurality of blades have a rotating tip formed thereon defining a surface thereon. The rotating tip of the plurality of blades form an annular rotating shroud portion being generally symmetrical about the central axis. A shroud assembly is attached to the outer housing and is spaced a preestablished distance from the annular rotating shroud portion being formed by the plurality of blades and having a surface. An interface is formed between the inner surface of the shroud assembly and the surfaces defined on the annular rotating shroud portions. A seal is positioned in the interface.

BRIEF DESCRIPTION OF THE DRAWINGS

FIG. 2 is an enlarged sectional view of a ceramic blade, a disc and an interface between a tip of the blade and a shroud taken along line 2—2 of FIG 1;

FIG. 3 is an enlarged sectional view of the interface between the tip of the blade and the shroud taken along line 3—3 of FIG. 2; and FIG. 4 is an enlarged sectional view of a rib member and a brush type seal assembly taken within line 4 of FIG. 3.

BEST MODE FOR CARRYING OUT THE INVENTION

Figure 1:
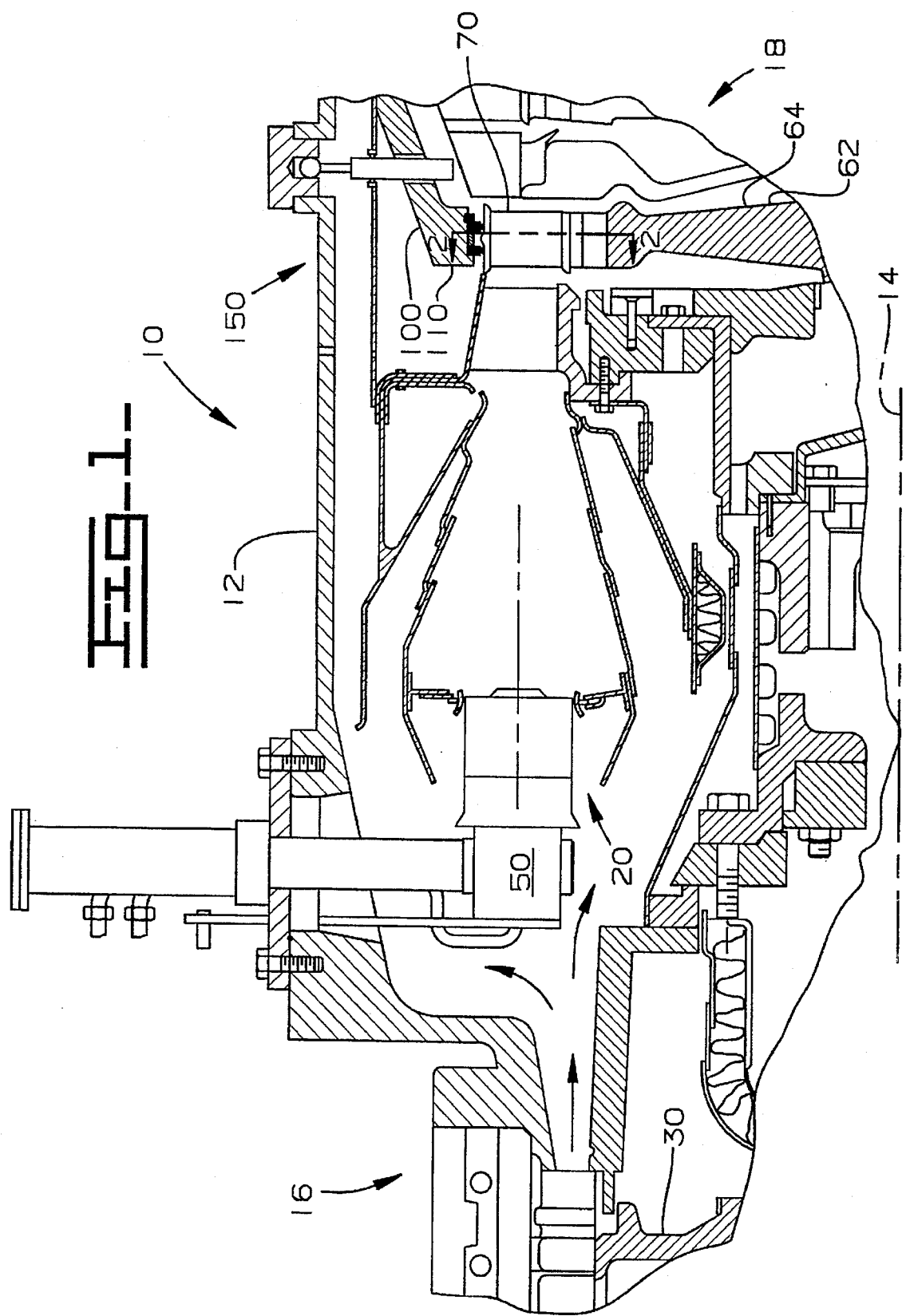
FIG. 1 is a partial side view of a gas turbine engine embodying the present invention with portions shown in section for illustration convenience.

Referring to FIG. 1, a gas turbine engine 10 is shown. The gas turbine engine 10 has an outer housing 12 having a central axis 14. Positioned in the housing 12 and centered about the axis 14 is a compressor section 16, a turbine section 18 and a combustor section 20 positioned operatively between the compressor section 16 and the turbine section 18.

When the engine 10 is in operation, the compressor section 16, which in this application includes an axial staged compressor 30 or, as an alternative, a radial compressor or any source for producing compressed air, causes a flow of compressed air which has at least a part thereof communicated to the combustor section 20. The combustor section 20, in this application, includes an annular combustor 32 having a plurality of injector 50 positioned therein, of which only one is shown.

The turbine section 18 includes a gas producer turbine 62 connected in driving relationship to the compressor section 16. The gas producer turbine 62 includes a disc assembly 64 being rotationally positioned about the central axis 14. As best shown in FIGS. 2 and 3, the disc assembly 64 includes a disc 66 having a preestablished rate of thermal expansion, and having a plurality of grooves 68 defined therein in which a plurality of ceramic turbine blades 70 are attached within a corresponding one of the plurality of grooves 68. As an alternative, the plurality of blades could be attached to the disc 66 in many different manners, such as by pins.

As further shown in FIGS. 2 and 3, each of the plurality of blades 70 includes a root portion 72 generally confined within the corresponding one of the plurality of groove 68. Each of the blades 70 further includes a base portion 74 extending radially outward from the root portion 72, a blade portion 76 radially extending outward from the base portion 74 is a rotating tip 78 radially extending from the blade portion 76. The rotating tip 78 defines a first surface 80 having a portion thereof attached to the blade portion 76, a thickness 82 and a second surface 84 being radially outward of the first surface 80. The rotating tip 78 includes a generally parallelogram configuration having a pair of ends 86 and a pair of sides 88. As best shown in FIG. 4, attached to the second surface 84 is a rib member 90 extending between the pair of ends 86 and being generally centered between the pair of sides 88. Each of the plurality of blades 70, in this application, is made of a ceramic material, such as silicon carbide or silicon nitride, and has a preestablished rate of thermal expansion which is less than the preestablished rate of thermal expansion of the disc 66. In the assembled position, the rotating tip 78 of each of the plurality of blades 70 forms an annular shroud portion 96 being generally symmetrical about the central axis 14.

Radially spaced from the plurality of blades 70 is an outer shroud assembly 100. The outer shroud assembly 100 is attached to the outer housing 12 in a conventional manner and a plurality of inner tiles form a segmented cylinder 104 having an inner surface 106 being spaced from the second surface 84 of the plurality of turbine blades 70 a preestablished distance and forming an interface 108 therebetween. As an alternative, the inner tiles forming the segmented cylinder could be of a single piece configuration made of a material having a preestablished rate of thermal expansion being generally lower than that of the disc 66. Attached to the segmented cylinder 104 is a brush type seal assembly 110. In this application, the seal includes a brush type seal assembly removably attached to the shroud assembly 100. As an alternative, the seal could be of a hydrostatically gliding stationary surface type of seal. In this application, a pair of brush type seal assemblies 110 are attached so that in the assembled position one of the brush type seal assemblies 110 will be positioned on each side of the rib member 90. Each of the plurality of inner tiles forming the segmented cylinder 104 has an annular face 112 defined thereon. An annular groove 114 is defined within the inner surface 106 and is spaced from the face 112 a preestablished distance.

In this application, the brush type seal assembly 110 is made of a plurality of fibers or hair like members 122 having a first end portion 124 and a second end portion 126. The fibers 122, which can be make of such materials as ceramic or metal, have a preestablished rate of thermal expansion being generally equal to that of the plurality of blades 70 and the physical characteristics of being flexible and being able to bend with a preestablished stiffness. The first end portion 124 is in rubbing relationship with the second surface 84 of the plurality of blades 70. The second end portion 126 is positioned within a generally cylindrical carrier 128 having a generally "U" shaped cross-sectional configuration defining a base portion 130 having a pair of legs 132 extending therefrom. The pair of legs 132 retain the ceramic fibers 122 within the carrier 128 forming the brush type seal assembly 110.

In the assembled position, a brush type seal assembly 110 is positioned within the plurality of inner tiles forming the segmented cylinder 104 and has one of the pair of legs 132 in contact with the face 112. A spacer 138 having a predetermined width is positioned against the other leg of the pair of legs 132. And, an other brush type seal assembly 110 has one of its pair of legs 132 positioned against the spacer 138 spacing each of the brush type seal assemblies 110 a preestablished distance apart. A retainer device 140 is positioned within the annular groove 114 and retains the brush type seal assemblies 110 and the spacer 138 in working operational relationship.

Thus, a sealing device 150 for the interface 108 between the plurality of ceramic blades 70 and the rigid turbine stator 104 is formed. The interface between the plurality of ceramic blades 70 and the rigid turbine stator or the inner tiles forming the segmented cylinder 104 is sealingly filled by the brush type seal assemblies 110. Furthermore, since the fibers 122 are generally flexible and will retain their elasticity a seal is formed between the interface 108 increasing efficiency. Furthermore, since the fibers 122 are flexible a light rubbing characteristic between the plurality of ceramic blades 70 and the ceramic fibers 122 will occur without causing catastrophic failure.

INDUSTRIAL APPLICABILITY

In use, the gas turbine engine 10 is started and allowed to warm up as in any suitable power application. As the demand for load or power is increased, the load on the engine 10 output is increased by increasing the fuel supply resulting in the temperature within the engine 10 increasing. The components used to make up the disc assembly 64, being of different materials and having different rates of thermal expansion, grow at different rates. For example, the metallic disc 66 expands at a greater rate than does the plurality of ceramic blades 70. The results thereof being that the plurality of blades 70 move radially outward. After shutdown, the metallic outer shroud assembly 100 shrinks radially inward resulting in the interface 108 between the plurality of blades 70 and inner surface 106 of the plurality of inner tiles forming the segmented cylinder 104 being reduced. The remaining interface or clearance 108 has the brush type seal assemblies 110 positioned therein. The first of the brush type seal assemblies 110 being positioned nearest to the combustor section 20, restrains the flow of combusted gases between the plurality of blades 70 and the inner segmented cylinder 110. For example, the first end portion 124 of the ceramic fibers 122 are in contacting relationship with the second surface 84 of each of the plurality of blades 70 and applies a radial sealing force. As the combusted gases increase in pressure, the ceramic fibers 122 become stiffer and come in contact with the surface 84 of the rotating shroud and applies a larger radial sealing force. Thus the interface 108 is sealed.

Any leakage of combusted gases beyond the first of the brush type seal assemblies 110 is further restrained by the second of the brush type seal assemblies 110 which is positioned on the side of the rib member 90 away from the combustor section 20. Like the first of the brush type seal assemblies 110, the second of the brush type seal assemblies 110 has the first end portion 124 of the ceramic fibers 122 in contacting relationship with the second surface 84 of each of the plurality of blades 70 applying a radial sealing force. The sealing forces, radial and axial, are applied along the entire second surface 84 of the annular shroud portion 96. The elasticity of the ceramic fibers 122 forms a seal between the brush type seal assembly 110 and the plurality of blades 70 restraining the flow of combusted gases through and beyond the interface 108.

Thus, the enlarged interface 108 between the metallic outer shroud assembly 100 and the plurality of ceramic blades 70 is filled by the brush type seal assembly 110 and the excessive flow of combusted gases through the interface 108 is restrained. When using a ceramic blade, the catastrophic failure resulting from the rubbing of the ceramic blade and the outer shroud is eliminated and the efficiency of the gas turbine engine 10 is retained.

Other aspects, objects and advantages of this invention can be obtained from a study of the drawings, the disclosure and the appended claims.

We claim:

1. A sealing device including:

a disc assembly defining a disc being made of a material having a preestablished rate of thermal expansion, a plurality of blades being attached to the disc, each of said plurality of blades being made of a material having a preestablished rate of thermal expansion being less than the preestablished rate of thermal expansion of the disc, having a rotating tip formed thereon defining a surface thereon;

a shroud assembly being radially spaced a preestablished distance from the plurality of blades, having an inner surface defined thereon and forming a radially spaced interface between the inner surface and the surfaces defined on the rotating tip of the plurality of blades;

a seal being positioned within the radially spaced interface and being attached to the shroud assembly, said seal includes a plurality of fibers having a preestablished rate of thermal expansion being generally equal to that of the plurality of blades.

2. The sealing device of claim 1 wherein said plurality of fibers defines a first end portion being in contacting relationship with the surface defined on the rotating tip.

3. The sealing device of claim 2 wherein during rotational operation of the plurality of blades relative to the shroud assembly the contacting relationship has a rubbing characteristic.

4. The sealing device of claim 1 wherein said plurality of blades define a pair of ends and a pair of sides, said plurality of blades further include a rib member extending between the pair of ends and being generally centered between the pair of sides.

5. The sealing device of claim 4 wherein said sealing device further includes a seal being positioned on each side of the rib member.

6. The sealing device of claim 4 wherein during rotational operation of the plurality of blades relative to the shroud assembly said plurality of fibers defines a first end portion being in contacting relationship with the surface defined on the rotating tip and said contacting relationship has a rubbing characteristic with the rim member.

7. The sealing device of claim 1 wherein said attachment of the seal to the shroud assembly is removably attached.

8. The sealing device of claim 7 wherein said shroud assembly includes a face defined thereon and an annular groove defined therein and said seal is positioned in contacting relationship with said face and is retained thereagainst by a retainer device.

9. The sealing device of claim 8 wherein a spacer is interposed the seal and the retainer device.

10. The sealing device of claim 9 wherein an additional seal is interposed the spacer and the retainer device.

11. A gas turbine engine having an outer housing and a central axis defined therein, said gas turbine engine comprising:

a disc assembly being rotatably positioned about the central axis, defining a disc being made of a material having a preestablished rate of thermal expansion;

a plurality of blades being attached to the disc, each of said plurality of blades being made of a material having a preestablished rate of thermal expansion being less than the preestablished rate of thermal expansion of the disc and having a rotating tip formed thereon defining a surface thereon, each of said rotating tips of the plurality of blades forming an annular rotating shroud portion being generally symmetrical about the central axis;

a shroud assembly being attached to the outer housing, being spaced a preestablished distance from the annular rotating shroud portion being formed by the plurality of blades and having an inner surface defined thereon;

a radially spaced interface being formed between the inner surface of the shroud assembly and the surfaces defined on the rotating tips;

a seal including a plurality of fibers having a preestabished rate of thermal expansion being generally equal to that of the plurality of blades being positioned in the radially spaced interface, said seal being in contacting relationship with the inner surface of the shroud assembly and the surfaces on the plurality of blades.

12. The gas turbine engine of claim 11 wherein said seal has a preestablished rate of thermal expansion being generally equal to that of the plurality of blades.

13. The gas turbine engine of claim 11 wherein said seal includes a plurality of fibers defining a first end portion being in contacting relationship with the surfaces defined on the rotating tip forming the annular shroud portion.

14. The gas turbine engine of claim 13 wherein during operation of the gas turbine engine and rotation of the plurality of blades relative to the stationary shroud assembly the contacting relationship has a rubbing characteristic.

15. The gas turbine engine of claim 11 wherein said seal is attached to the shroud assembly.

16. The gas turbine engine of claim 11 wherein said interface further includes an other seal being space from the other seal a preestablished distance.

* * * * *